March 3, 1964   E. E. BREUNING ETAL   3,123,099
HIGH PRESSURE FLUID COUPLING
Filed April 26, 1960   6 Sheets-Sheet 1

INVENTORS:
Erich E. Breuning
Jorge Torres

Attorneys.

March 3, 1964 E. E. BREUNING ETAL 3,123,099
HIGH PRESSURE FLUID COUPLING
Filed April 26, 1960 6 Sheets-Sheet 4

INVENTOR
Erich E. Breuning
Jorge Torres

By Smyth, Roston & Pavitt
Attorneys.

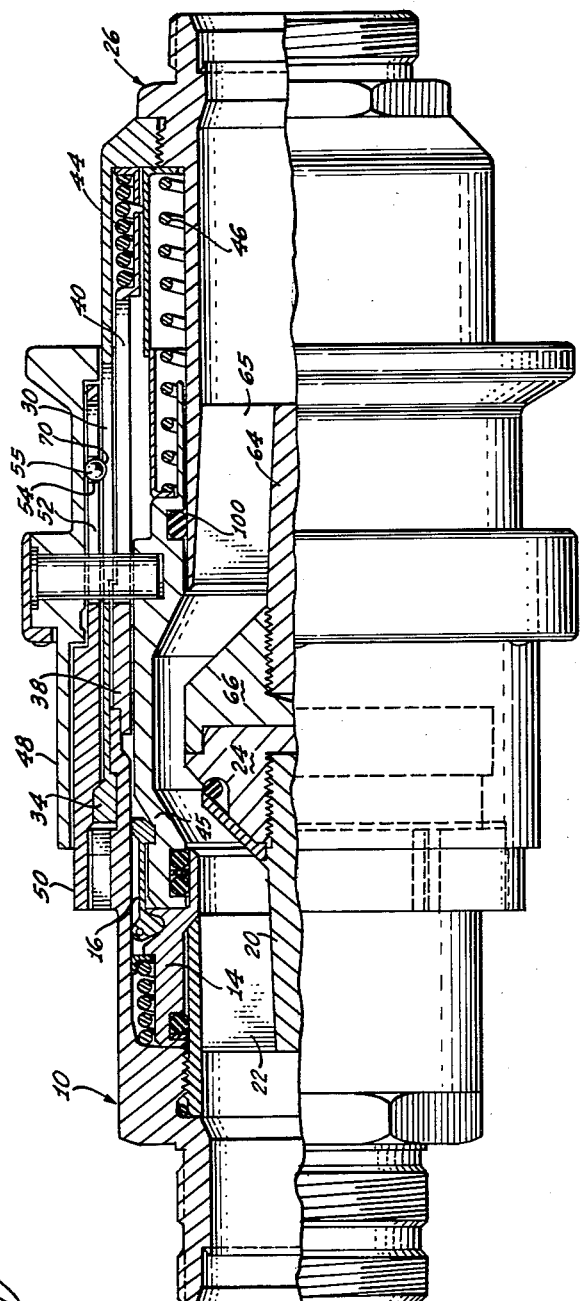

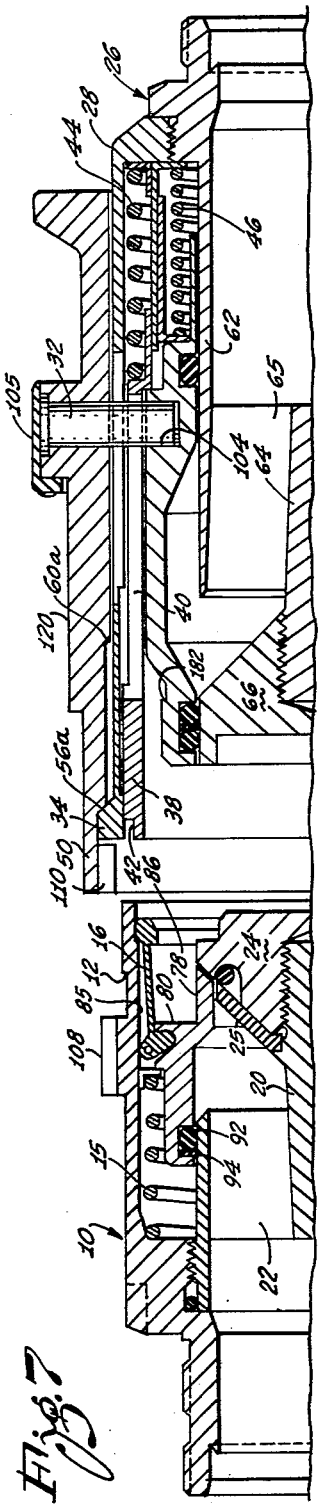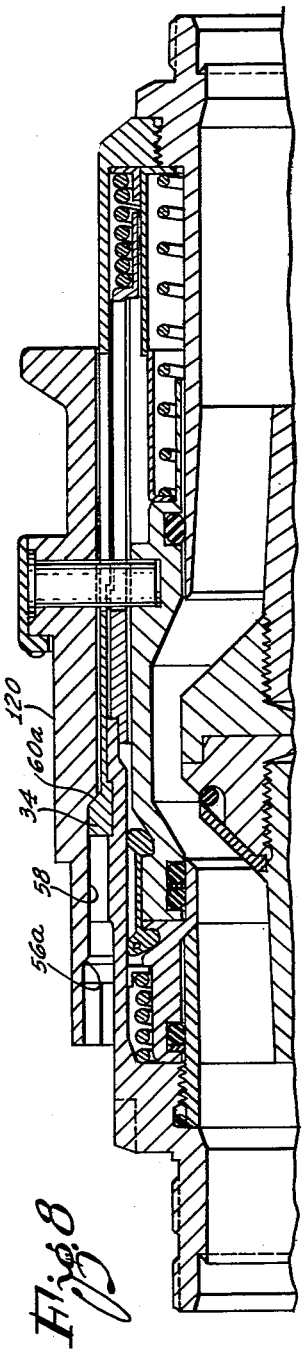

United States Patent Office 3,123,099
Patented Mar. 3, 1964

3,123,099
HIGH PRESSURE FLUID COUPLING
Erich E. Breuning, Hollywood, and Jorge Torres, Los Angeles, Calif., assignors to Purolator Products, Inc., a corporation of Delaware
Filed Apr. 26, 1960, Ser. No. 24,831
6 Claims. (Cl. 137—614.06)

This invention relates to a coupling assembly of the type in which two coupling bodies mounted on the ends of two passage or conduit means, respectively, interlock automatically when forced together telescopically and in which at least one of the coupling bodies has a valve means for control of fluid through the coupling assembly. The invention is directed to certain problems that arise in the construction of such a coupling assembly for various specific uses.

One problem to which the invention is directed is to provide such a coupling assembly for use with high pressure fluids wherein the valve means cannot be opened unless the two coupling bodies are safely connected together and, conversely, the interconnected coupling bodies cannot be released from each other unless the valve means is closed. The solution to this problem requires an inherent cycle of operation in which an actuating means is movable through a range in opposite directions with means provided to connect and disconnect the two coupling bodies in response to movement of the actuating means through one portion of this range and with means provided to open and close the valve means during a separate portion of the range. Thus movement of the actuating means through the whole range from a normal retracted position to an extended position results first in locking of the two coupling bodies together and results subsequently in opening of the valve means. On the other hand, the return movement of the actuating means through the whole range first closes the valve means and thereafter disengages the interconnecting means to release the two coupling bodies from each other.

Another problem is to provide such a valve assembly for use with fluids under high pressure, for example 4,000 p.s.i. or higher, in which the operating cycle for connecting and disconnecting the two coupling bodies and for opening and closing the valve means may be carried out manually, notwithstanding the high fluid pressure. One requirement here is that the valve means be balanced with respect to the surfaces thereof that are exposed to the confined fluid. Another requirement is avoidance of a high magnitude separation force between the two interconnected coupling bodies arising from residual fluid trapped between the two bodies when the valve means is closed in preparation for opening the coupling.

Other problems relate to such a coupling assembly for high pressure fluids wherein both of the two coupling bodies are provided with normally closed valves to cut off both of the two conduit means when the two coupling bodies are separated. One of these problems is to make both valves responsive to a single actuating means. Another of these problems, of course, is to balance both valves to avoid the necessity of overcoming high fluid pressure in operating the two valves. Another of these problems that arises in some uses of the invention is to make it impossible for safety reasons to open the two valves if a particular one of the two coupling bodies confines fluid under high pressure while the other coupling body does not confine fluid under high pressure.

To meet all of these requirements, the preferred embodiment of the invention provides a first coupling body with a valve that is normally closed by spring force, a second coupling body with a normally closed second valve and an actuating means on the second coupling body including means to interconnect the two coupling bodies and means to move the second valve against the first valve to open both valves after the interconnection between the two coupling bodies is completed. The actuating means is directly connected to the second valve by radial means to shift the second valve against the first valve for opening of both valves, and the actuating means cams engagement means on the second coupling body into engagement with the first coupling body to interconnect the two bodies.

In the preferred practice of the invention, the actuating force for advancing the actuating means is a spring and the actuating means is normally latched at its retracted position in opposition to the spring force. Under the pressure of the spring, the actuating means readily cams the engagement means radially inward to interconnect the two coupling bodies.

Since the operating cycle for sequentially interconnecting the two coupling bodies and opening the two valves cannot be initiated unless the two coupling bodies are telescoped together in position for interlocking engagement, and since the first portion of the cycle in which the coupling bodies are locked together does not overlap the second portion in which the two valves open, the coupling assembly is inherently foolproof. The two valves cannot open unless the coupling bodies are interlocked and the interlocked coupling bodies cannot be separated unless the two valves are closed.

The second valve that is directly operated by the actuating means is balanced with respect to the pressure of the fluid that it confines. The first valve that is operated by the second valve is not balanced but is balanced by fluid released by the second valve. This arrangement is highly advantageous in an installation where it would be hazardous to open the first valve in the first coupling body in the absence of fluid under pressure in the second coupling body. Since the first valve is held closed by an unbalanced pressure of high magnitude, it cannot be opened by manual force unless the opening of the second valve releases the necessary balancing high pressure fluid from the second coupling body.

When the two coupling bodies are interconnected for high pressure fluid flow, a small quantity of the highly pressurized fluid is trapped between the two coupling bodies to exert a high magnitude separating force. As the second valve retracts from the first valve in preparation for disconnecting the two valve bodies, it forms an annular void inside the coupling assembly, and as it retracts further and completely closes, it vents the trapped fluid to the annular void and thus destroys the high magnitude separation force.

The features and advantages of the invention may be understood by reference to the following detailed description and the accompanying drawings.

3

In the drawings, which are to be regarded as merely illustrative:

FIG. 1 is a view partly in section and partly in side elevation showing the two coupling bodies in the selected embodiment of the coupling assembly, the two coupling bodies being disconnected and separated from each other;

FIG. 2 is a view similar to FIG. 1 showing the two coupling bodies moved towards each other for partial retraction of the stay-back sleeve but not far enough to unlatch the two actuating sleeves for carrying out the cycle of sequentially interlocking the two coupling bodies and opening the two valves. To facilitate understanding the operation only the parts that move in this sage of the operation are cross-hatched in FIG. 2;

FIG. 5 is a similar view at the completion of the cycle of operation with the two coupling bodies interlocked and with both of the valves fully open;

FIG. 6 is a fragmentary sectional view showing the construction of an inner portion of one of the valve bodies, the section being taken as indicated by the line 6—6 of FIG. 2;

FIG. 7 is a fragmentary sectional view of a modified form of the coupling with the two coupling bodies separated; and FIG. 8 is a similar view with the two coupling bodies interlocked.

General Arrangement

Figure 1:
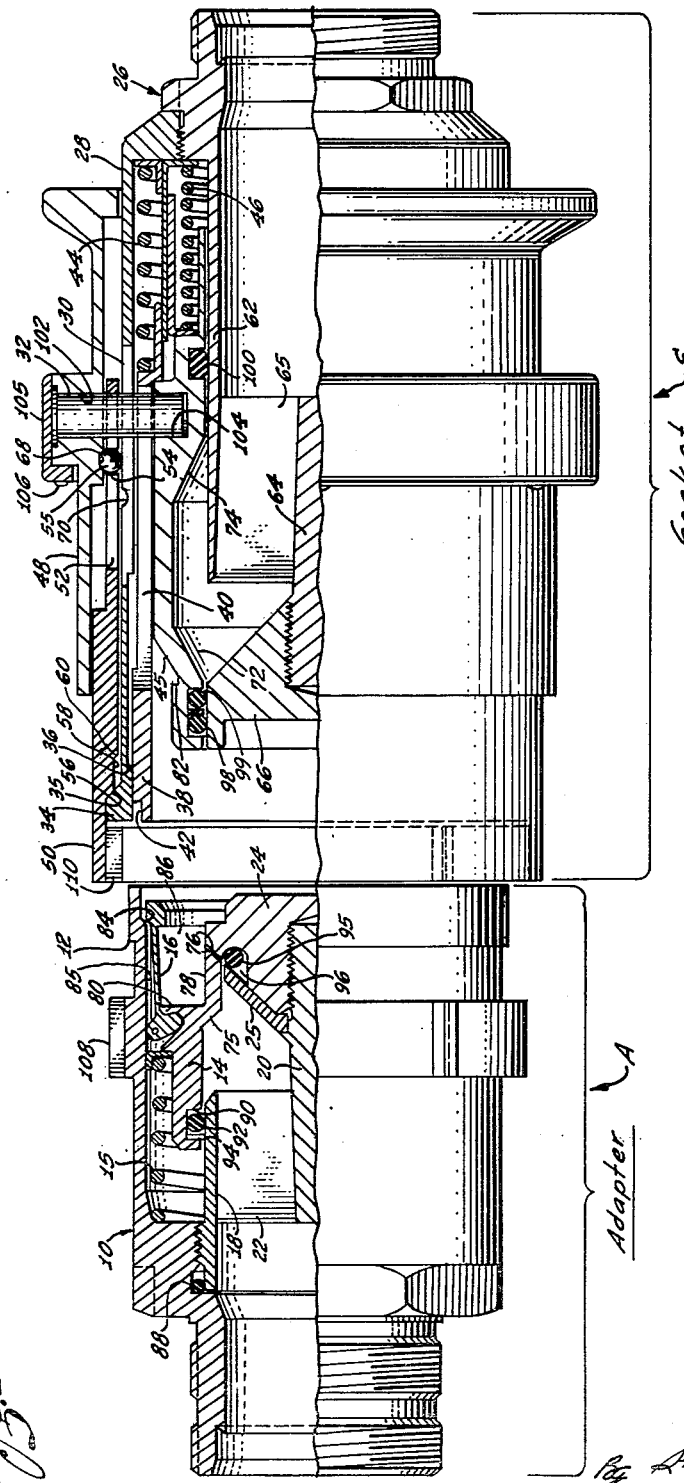

In the embodiment of the invention selected for this disclosure, the two cooperating coupling parts comprise an adapter fitting, generally designated by the letter A, which, for example, may be mounted on a missile flush with the missile skin, and a socket fitting, generally designated by the letter S, which is on the end of a flexible hose. FIG. 1 shows the socket S close to the adapter A in position for axial movement into interlocking engagement with the adapter.

The principal parts of the adapter A include: an adapter body 10 formed with an outer circumferential locking shoulder 12; a slide valve 14 which is urged to its normal closed position by a coil spring 15; a circumferential series of normally disengaged latching fingers 16 carried by the slide valve 14; and a fixed axial structure which cooperates with the slide valve and which comprises an inner cylinder 18 on which the slide valve is slidingly mounted, an axial body 20 which is integrally connected with the inner cylinder 18 by longitudinal radial webs 22, a nose member 24 threaded onto the outer end of the axial body 20, and a thin conical skirt 25 that is mounted on the axial body 20 and is retained thereon by the nose member 24.

The principal parts of the socket S include: a socket body 26; a collet sleeve 28 which may be considered a part of the socket body since it is fixedly mounted thereon by screw threads, the collet sleeve having a plurality of circumferentially spaced longitudinal slots 30 to clear corresponding radial pins 32; a circumferential series of flexible collet fingers 34 that are formed by the collet sleeve 28, each collet finger having an inclined outer camming shoulder 35 and also having an inner radial locking shoulder 36 to engage the previously mentioned locking shoulder 12 of the adapter A, the collet fingers being biased radially outward to their release positions; a stay-back sleeve 38 that is normally in a forward position inside the circumferential series of collet fingers 34 to prevent inward flexure of the collet fingers out of their

4 release positions, the stay-back sleeve being formed with circumferentially spaced longitudinal slots 40 to clear the radial pins 32, respectively, and being formed with a rim recess 42 to permit the stay-back sleeve to telescope into the rim of the adapter fitting body 10; a coil spring 44 which urges the stay-back sleeve 38 towards its normal forward position; a slide valve 45 which is normally closed; a coil spring 46 which urges the slide valve 45 forward to its open position; a primary actuating sleeve 48 which is operatively connected to the slide valve 45 by the previously mentioned radial pins 32; a secondary actuating sleeve 50 having a plurality of circumferentially spaced longitudinal slots 52 to clear the radial pins 32, respectively, and also having a plurality of apertures 54 offset circumferentially from the slots 52 to receive corresponding latching balls 55, the secondary actuating sleeve being formed with an inner circumferential camming shoulder 56 which normally abuts the camming shoulder 35 of the collet fingers 34 and being further formed with an inner circumferential step 58 and a second inner shoulder 60, the function of the inner circumferential step being to embrace the outer ends of the collet fingers 34 to lock the collet fingers in their positions of locking engagement with the locking shoulder 12 of the adapter fitting body 10; and a fixed axial structure for cooperation with the slide valve 45 comprising an inner cylinder 62 integral with the socket body 26, an axial body 64 that is integrally connected with the inner cylinder 62 by longitudinal radial webs 65 and a nose member 66 that is threaded onto the axial body 64.

The small latching balls 55 that are positioned in the apertures 54 of the secondary actuating sleeve 50 for movent therewith are of substantially greater diameter than the radial thickness of the secondary actuating sleeve for the purpose of latching the secondary actuating sleeve to the primary actuating sleeve 48 for movement therewith and alternately latching the secondary actuating sleeve to the collet sleeve 28 for the purpose of immobilizing or locking the secondary actuating sleeve at its forward position at which it locks the collet fingers 34 in their engagement with the locking shoulder 12 of the adapter A. FIG. 1 shows how the latching balls 55 extend radially outward into a first inner circumferential latching groove 68 of the primary actuating sleeve 48 for operatively interconnecting the two actuating sleeves and FIG. 5 shows how the latching balls alternately extend radially inward into a second outer circumferential latching grove 70 of the fixed collet sleeve 28 to immobilize or latch the secondary actuating sleeve in its forward position when the adapter and the socket are interconnected.

Operation

Figure 2:
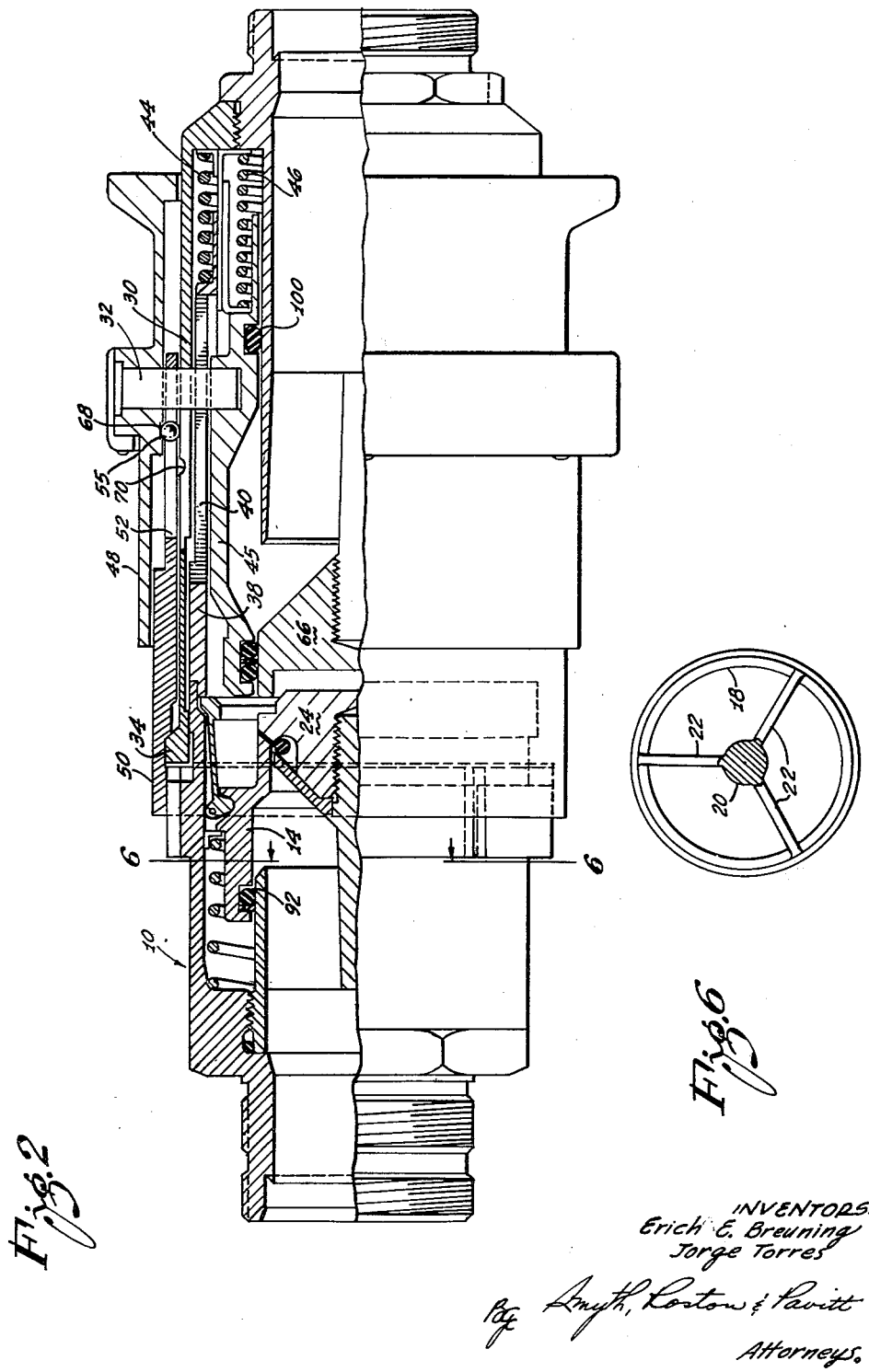
Figure 3:
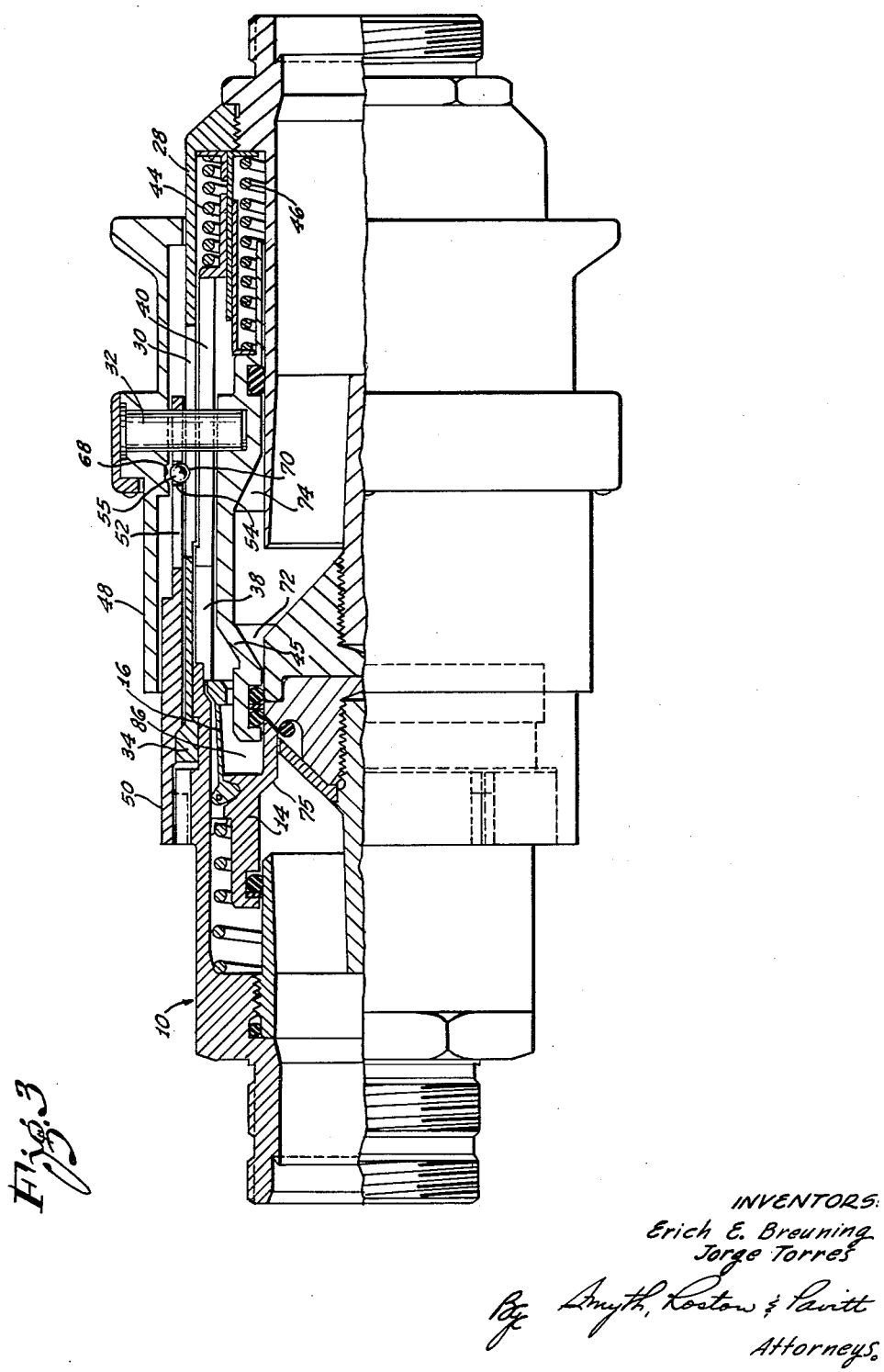
FIG. 3 is a similar view showing the parts just after the unlatching step with the two coupling bodies effectively interconnected and with the second valve at an early stage in its spring-actuated opening movement. Here again, only the parts that move are cross-hatched.
Figure 4:
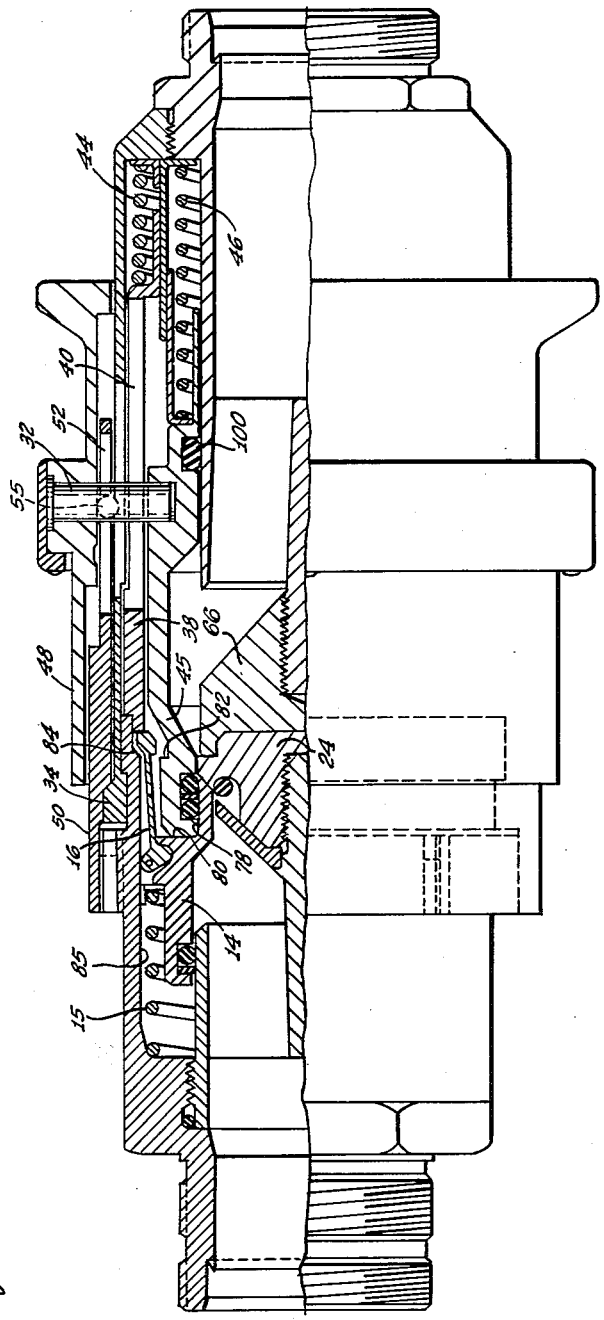
FIG. 4 is a similar view at a still later stage where the second valve has advanced into abutment with the first valve in preparation for opening the first valve, only the parts that move being cross-hatched.

FIG.1 shows the adapter fitting and the socket fitting positioned relative to each other in preparation for interconnection and FIGS. 2, 3 and 4 show successive stages in the procedure that leads to the complete interlocking of the two coupling bodies that is illustrated in FIG. 5.

When the socket S is separated from the adapter A as shown in FIG. 1, the slide valve 45 is held at its normal retracted open position in opposition to the spring 46 by the latching effect of the expanded series of collet fingers 34. Thus with the collet fingers 34 held at their radially outward positions by the stay-back sleeve 38, the camming shoulders 35 of the collet fingers abut the camming shoulder 56 of the secondary actuating sleeve 50 to block forward movement of the actuating sleeve, the latching balls 55 in the apertures 54 of the secondary actuating sleeve engage the latching groove 68 of the primary actuating sleeve 48 to hold the primary actuating sleeve in its retracted position and the radial pins 32 connect the primary actuating sleeve 48 with the slide valve 45 to hold the slide valve in its retracted position in opposition to the spring 46.

When the socket S is moved towards the adapter A from the initial position shown in FIG. 1 to the position shown in FIG. 2, the leading end of the adapter body 10 meets the leading end of the stay-back sleeve 38 and mates with the stay-back sleeve by entering the rim recess 42 to initiate the retraction movement of the stay-back sleeve. With this action, the leading end of the secondary actuating sleeve 50 and the collet fingers 34 telescope over the leading end of the adapter body 10. The secondary actuating sleeve acting under the pressure of the valve spring 46 tends to cam the collet fingers 34 radially inward but the collet fingers 34 are maintained in their expanded state by the leading end of the adapter body 10. Thus as the stay-back sleeve 38 is initially retracted, it is replaced by the leading end of the adapter body 10 in the function of keeping the collet fingers 34 expanded. The expanded collet fingers continue to serve as latch means to prevent spring-actuated forward movement of the secondary actuating sleeve 50 together with the primary actuating sleeve 48 and the slide valve 45. The retraction of the stay-back sleeve 38 is opposed by the coil spring 44, and the slots 40 in the stay-back sleeve keep the retraction from being blocked by the radial pins 32.

In the continued relative movement of the adapter A and the socket S towards each other from the position shown in FIG. 2 to the position shown in FIG. 3, the retraction of the stay-back sleeve 38 by the adapter body 10 continues. The enlarged ends of the collet fingers 34 continue to advance relative to the adapter until the locking shoulders 36 of the collet fingers clear the outer circumferential locking shoulder 12 of the adapter body 10 whereupon the secondary actuating sleeve 50 acting under spring pressure cams the collet fingers 34 radially inward into engagement with the outer circumferential shoulder 12. The spring-actuated movement of the secondary acting sleeve 50 continues until the inner circumferential step 58 of the secondary actuating sleeve fits snugly over the inwardly flexed collet fingers 34 to lock the collet fingers in their positions of engagement with the outer circumferential shoulder 12 of the adapter body 10. Thus in FIG. 3, the adapter and the socket are interconnected and locked together in a positive manner to make it safe to initiate the opening of the two slide valves to permit fluid flow through the coupling assembly.

In FIG. 2 as in FIG. 1, the latching balls 55 which are housed in the apertures 54 of the secondary actuating sleeve 50 protrude from the secondary actuating sleeve radially outward into the inner latching groove 68 of the primary actuating sleeve 48 to interconnect the two actuating sleeves in a positive manner, but when the secondary actuating sleeve 50 slides forward to its locking position shown in FIG. 3, the latching balls 55 are carried forward to register with the circumferential latching groove 70 of the collet sleeve 28. The pressure of the valve spring 46 acting on the primary actuating sleeve 48 through the radial pins 32 causes the latching groove 68 of the primary actuating sleeve to cam the latching balls 55 into the latching groove 70 of the collet sleeve 28. This radially inward shift of the latching balls 55 immobilizes the secondary actuating sleeve 50 at its forward limit position by latching the secondary actuating sleeve to the fixed collet sleeve. The radially inward shift of the latching balls 55 also disengages the primary actuating sleeve 48 from the secondary actuating sleeve 50 to permit continued shift of the slide valve 45.

It is apparent from an inspection of FIGS. 2 and 3 that the nose member 66 of the socket meets the nose member 24 of the adapter at the moment when the collet fingers 34 advance relative to the adapter sufficiently to make engagement with the outer circumferential locking shoulder of the adapter and it is further apparent in FIG. 3 that the forward movement of the secondary actuating sleeve 50 to its forward limit position permits the slide valve 45 of the socket to advance. The two abutting nose members 66 and 24 guide the slide valve 45 into telescoping engagement with the valve member 14. It is to be especially noted, however, that the forward advance of the slide valve 45 is not sufficient to carry the slide valve to an open position for release of the confined pressurized fluid from the socket S to the adapter A. Thus the valve 45 slides forward to a small extent with the secondary actuating sleeve 50 as the secondary actuating sleeve shifts to its forward limit position for positively interlocking the two coupling bodies but it cannot be said that actual opening of the slide valve 45 is or can be initiated before the two coupling bodies are positively interlocked.

The unlatching of the primary actuating sleeve 48 from the secondary actuating sleeve 50 that occurs automatically when the moving parts reach the position shown in FIG. 3 releases the slide valve 45 for continued forward movement with the primary actuating sleeve to the position shown in FIG. 4, the movement being actuated by the valve spring 46. The slide valve 45 moves freely under the force exerted by the spring 46 notwithstanding the fact that the slide valve in its closed position confines fluid under high pressure. The slide valve 45 is not affected by the high pressure because it is balanced with respect to its surfaces that are exposed to the pressure. Thus the effective area of the forward inner taper 72 of the slide valve 45 is equal to the effective area of the rearward inner taper 74, the two tapers being coextensive in radial dimension.

The slide valve 14 in the adapter A is not balanced in this manner, however, because although the inner taper 75 is exposed to the fluid that is confined by the valve, the corresponding surface 76 (FIG. 3) at the forward end of the valve is cut off from the confined fluid. Since the pressure of the confined fluid may be several thousand p.s.i., the slide valve 14 cannot be opened by any ordinary force such as manual force or the force exerted by the spring 44 unless the forward surface 76 of the valve is subjected to a balancing pressure.

In the position of the moving parts shown in FIG. 4, the slide valve 45 has moved beyond the nose member 24 of the adapter A and has moved into position telescoped over a forward cylindrical portion 78 of the valve 14 into abutment with a radial shoulder 80 of the valve 14. Thus the slide valve 14 interrupts the forward movement of the slide valve 45 at the positions of the two valves shown in FIG. 4 because of the high fluid pressure differential that urges the slide valve 14 towards its closed position. The interruption of the forward movement of the slide valve 45 is only momentary, however, because as may be seen in FIG. 4, the slide valve 45 is stopped only after it reaches a point at which it places the forward edge surface 76 of the slide valve 14 in communication with the confined fluid in the socket S thereby to balance the slide valve 14 with respect to fluid pressure. It is assumed that the pressure of the fluid confined by the socket is at least approximately the pressure of the fluid confined by the adapter.

With the slide valve 14 balanced with respect to its surfaces that are exposed to fluid under pressure, the spring-actuated advance of the slide valve 45 continues from the position shown in FIG. 4 to the position shown in FIG. 5 at the end of the cycle of operation. In FIG. 5, the slide valve 45 has completely retracted the slide valve 14, both of the slide valves being fully open for free flow of fluid between the adapter and the socket.

At the positions of the two valves 45 and 14 shown in FIG. 4, the latching fingers 16 that are carried by the valve 14 are poised for radial inward movement into latching engagement with a circumferential latch shoulder 82 of the slide valve 45. When the slide valve 45 pushes the slide valve 14 from the position shown in FIG. 4 to the position shown in FIG. 5, an inner circumferential tapered shoulder 84 of the adapter body 10 cams the latching fingers 16 inward into engagement with the latch shoulder 82 of the slide valve 45 and the inner circumferential surface 85 of the adapter body 10 thereafter holds the latching fingers 16 in their latching positions as long as the slide valve 14 is retracted from its closed position.

The described cycle of operation is reversed to disengage the adapter A and the socket S from each other. Beginning with the parts in their final positions shown in FIG. 5, the whole cycle may be reversed simply by manually retracting the primary actuating sleeve 48 against the resistance of the valve spring 46. In the first stage of the reverse operation in which the primary actuating sleeve 48 retracts to the position shown in FIG. 4, the latching fingers 16 operatively connect the slide valve 14 with the slide valve 45 to exert positive closing force on the valve 14 and thus avoid dependence solely on the force of the valve spring 15.

When the two valves reach the position shown in FIG. 4, the latching fingers 16 spring outward by their inherent bias to disconnect the two valves from each other, the slide valve 14 then being in its completely closed position. As the primary actuating sleeve 48 continues to be retracted from the position shown in FIG. 4 to the position shown in FIG. 3, the slide valve 45 withdraws from the closed slide valve 14 to a position at which the slide valve 45 closes to cut off the pressurized fluid in the socket S.

At this point in the reverse operation where both of the two slide valves 14 and 45 are safely closed, the inner circumferential latching groove 68 of the primary actuating sleeve 48 again registers with the latching balls 55 as shown in FIG. 3. Also at this point in the retraction of the primary actuating sleeve 48, the radial pins 32 that are carried by the actuating sleeve reach the rear ends of the longitudinal slots 52 of the secondary actuating sleeve 50. Continued retraction of the primary actuating sleeve 48 from this position shown in FIG. 3 causes corresponding retraction of the secondary actuating sleeve 50 with the result that the fixed circumferential latching groove 70 of the collet sleeve 28 cams the latching balls 55 outward into the circumferential latching groove 68 of the primary actuating sleeve whereby the latching balls 55 again interconnect the two actuating sleeves for movement in unison.

As the slide valve 45 retracts from the position shown in FIG. 3 to the position shown in FIG. 2, it uncovers the juncture between the two nose members 24 and 66 and thus releases trapped pressurized fluid from between the two nose members into the annular space or chamber 86 (FIG. 3) that is formed by the withdrawal of the valve 45 from the valve 14. It is to be noted that this venting of the trapped fluid into the annular space or chamber 86 occurs while the two coupling bodies are still positively locked together so that there is no possibility of the pressurized trapped fluid being released directly into the atmosphere. While the annular space or chamber 86 is closed nevertheless it is not sealed off from the atmosphere and therefore any high fluid pressure therein can exist only momentarily.

With the two valves 14 and 45 safely closed, the retraction of the secondary actuating sleeve 50 from the position shown in FIG. 3 towards the position shown in FIG. 2 withdraws the inner circumferential step 58 of the secondary actuating sleeve from the collet fingers 34 to permit the collet fingers to expand by their inherent bias to release the adapter body 10. As the adapter body 10 separates from the socket body 26, the forward end portion of the adapter body withdraws from the collet fingers 34 and is replaced by the back-up sleeve 38, the back-up sleeve shifting under the pressure exerted by the spring 44.

The spreading of the collet fingers 34 radially outward to their release positions places the enlarged ends of the collet fingers in position to cooperate with the camming shoulder 56 of the secondary actuating sleeve. When the primary actuating sleeve 50 is finally released from manual restraint after the two coupling bodies are disconnected, the valve spring 46 urges forward the interlocked assembly comprising the valve 45, the primary actuating sleeve 48 and the secondary actuating sleeve 50 but the inner camming shoulder 56 of the secondary actuating member meets the enlarged ends of the collet fingers to be restrained or latched by the collet fingers, as heretofore explained.

It is to be noted that the two nose members 24 and 66 mate together as shown in FIGS. 3, 4 and 5 to serve as cylindrical means to guide the sleeve valve 45 into abutment with the sleeve valve 14. For this purpose, the outside diameters of the two nose members 24 and 66 are equal to and concentric with the outside diameter of the forward cylindrical portion 78 of the valve member 14.

*Structural Details*

In the construction of the adapter 10, the previously described axial structure is sealed by an O-ring 88. The valve 14 is formed with an inner circumferential groove 90 to receive an O-ring 92 and a snap ring 94. The forward end of the valve 14 is sealed at its closed position by an O-ring 95 that is confined by a circumferential groove 96 in the nose member 24. The O-ring 95, the groove 96 and the thin conical skirt 25 that extends across the groove are so shaped and dimensioned that the pressurized fluid that is confined by the valve 14 at its closed position urges the O-ring 95 into position to cut off the clearance space between the nose member 24 and the forward edge of the valve 14.

In the construction of the socket S, the valve 45 is provided with a pair of closely spaced O-rings 98 and 99 which make sealing contact with the nose member 66 at the normal closed position of the valve. When the valve is advanced to the position shown in FIG. 3, only the O-ring 99 is effective to confine the fluid in the socket S but the one O-ring is adequate. When the forward end of the valve 45 is telescoped over the forward end of the valve 14, as shown in FIGS. 4 and 5, the two O-rings 98 and 99 seal the joint between the two valves. The valve 45 is further provided with a rearward inner circumferential groove to confine a second O-ring 100 which remains in sealing contact with the inner cylinder 62 of the socket body 26 throughout the range of movement of the valve member.

In the construction shown, the radial pins 32 that connect the primary actuating sleeve 48 with the valve 45 are mounted in bores 102 (FIG. 1) in the primary actuating sleeve and extend into blind bores 104 in the valve 45. The radial pins 32 are confined in their assembled positions by a surrounding retaining ring 105 which embraces the primary actuating sleeve 48 and is secured by small fastening elements 106.

Preferably suitable indexing means is provided to prevent the possibility of mismating different fluid lines in an installation where a plurality of the coupling assemblies are employed. For this purpose, the adapter body 10 may be provided with a plurality of external longitudinal spline-like keys 108 and the secondary actuating sleeve 50 of the socket S may be formed with a corresponding plurality of inner circumferential longitudinal recesses 110 to receive the keys. If any attempt is made to mismate a socket and an adapter, the advance of the socket into telescoping position for locking action by the collet fingers 34 will be blocked by the misaligned keys 108 to make it impossible to connect the socket with the adapter.

FIGS. 7 and 8 illustrate a modified form of the invention in which nearly all of the structure remains unchanged, as indicated by the use of corresponding numerals indicating corresponding parts. In effect, the modification consists of consolidating the previously described primary actuating sleeve 48 and cooperating a secondary actuating sleeve 50 into a single actuating sleeve 120. Since this consolidation eliminates the need for the previously described latching balls 55 and the cooperating latching grooves 68 and 70, the latching balls and latching grooves are omitted.

It may be seen in FIGS. 7 and 8 that the camming shoulder 56a and the inner shoulder 60a of the consolidated actuating sleeve 120 are spaced apart by a relatively large axial distance. This axial distance is sufficient to permit the actuating sleeve 120 to move the second slide valve 45 to its fully open position after the camming shoulder 56a contracts the collet fingers 34 into interlocking engagement with the adapter body 10. Thus the single actuating sleeve 120 performs the same functions as the primary actuating sleeve and the cooperating secondary actuating sleeve of the first described form of the invention. There is no change in the operating cycle with respect to the sequence of the interlocking of the two valve bodies and the operation of the two valves.

Our description in specific detail of the selected embodiments of the invention which suggest various changes, substitutions and other departures from our disclosure within the spirit and scope of the appended claims.

We claim:

1. The combination of: a first passage means and a second passage means; a first coupling means and a second coupling means mounted on the ends of said first and second passage means respectively for movement relative to each other toward each other into abutment with each other; releasable means to lock said two coupling means together; a first normally closed valve in said first coupling means to close off said first passage means; a second normally closed valve in said second coupling means to close off said second passage means, said first valve being responsive to said second valve when the two coupling means are interlocked to open when the second valve opens and to close when the second valve closes; an actuating means on said second coupling means movable axially thereof from a normal starting position through a given range relative thereto, said locking means being responsive to the movement of the actuator as it moves through a first portion of said range to lock the two coupling means together and said second valve being responsive to the movement of the actuator as it moves through a second portion of the range, with the second valve closing in response to said movement of the actuating means towards said first portion of the range and vice versa, and with said locking means remaining locked during movement of the actuating means towards said second portion of the range and vice versa, whereby said two valves are always closed when said locking means is released for separation of the two coupling means; means to urge said actuating means from its normal starting position through said range; and means to latch the actuating means at its starting position in opposition to said urging means, said latching means being releasable in response to said movement between the two coupling means.

2. A coupling assembly as set forth in claim 1 which includes means to latch the two valves together for movement in unison, said latching means being responsive to movement of the second valve to interconnect the two valves when the second valve initially moves out of its normal closed position and vice versa.

3. The combination of: a first fluid passage means and a second fluid passage means for high pressure fluid flow therethrough; a first coupling means mounted on said first passage means and having a normally closed first valve; a second coupling means mounted on said second passage means for connection with the first coupling means, said second coupling means having a normally closed second valve with actuating means therefor, said second valve moving against the first valve to open the first valve when the second valve is opened while the two coupling means are interconnected, said second valve having equal and opposite effective areas exposed to the fluid in the second coupling means when the second valve is closed thereby to balance the second valve for opening movement; said first valve having equal and opposite effective areas, one of said last-mentioned areas being exposed to the fluid in the first coupling means when the first valve is closed; means to cut off the other of said last-mentioned areas from the fluid in the first coupling means when the first valve is closed; and in which said second valve is dimensioned to open slightly in advance of opening the first valve thereby to place the fluid in the second coupling means in communication with said other of said last mentioned effective areas of the first valve to balance the first valve for opening movement, whereby the opening of the two valves manually is assisted when fluid pressure exists in said second coupling means.

4. The combination of: a first passage means and a second passage means for conveying high pressure fluid; a first coupling means and a second coupling means mounted on the ends of said first and second passage means respectively; a normally closed valve of cylindrical configuration in said first coupling means having a forwardly facing shoulder and an outer circumferential surface of a given diameter extending forward from said shoulder; means to releasably connect said two coupling means together; a first fixed axial structure in said first coupling means to confront the forward end of said first valve at the closed position thereof, said fixed structure having an outer circumferential guide surface of substantially said given diameter aligned with said outer circumferential surface of the valve at the closed position of the valve; a normally closed second valve of cylindrical cross section in said second coupling means, the inside diameter of said second valve being substantially said given diameter; actuating means to move said second valve axially to open position; a second fixed axial structure in said second coupling means having an outer circumferential guide surface of substantially said given diameter embraced by said second valve at the closed position thereof, said two fixed structures mating when the two coupling means are connected thereby to guide said second valve into position telescoping over said outer circumferential surface of the first valve for opening of the first valve by opening movement of the second valve against said shoulder of the first valve.

5. A coupling assembly as set forth in claim 4 in which said second valve has equal and opposite effective areas exposed to the fluid pressure in the second coupling means when the second valve is closed whereby the second valve is balanced; in which said first valve has equal and opposite effective areas, one of which areas of the first valve is exposed to the fluid in the first coupling means when the first valve is closed, the other of which areas of the first valve includes an area confronting said first axial structure when the first valve is closed; means to cut off said other area of the first valve from the fluid in the first coupling means when the first valve is closed, said two valves and guide surfaces being dimensioned for the second valve to open while the two coupling means are connected thereby to place the fluid in the second coupling means in communication with said confronting area before the second valve opens the first valve whereby the first valve is balanced for its opening movement.

6. The combination of: a first passage means and a second passage means;
   a first coupling means and a second coupling means mounted on the ends of said first and second passage means respectively and for movement relative to each other from separated positions into mutual abutment;
   a first normally closed valve in said first coupling means to close off said first passage means;
   a second normally closed valve in said second coupling means to close off said second passage means, said first valve being responsive to said second valve when the two coupling means are interlocked to open when the second valve opens and to close when the second valve closes;
   means on said second coupling means to engage said first coupling means in response to said relative movement between the two coupling means;

means responsive to the engagement of said engagement means to lock the engagement means for positively interlocking the two coupling means;

spring-driven actuating means on said second coupling means movable from a retracted position to an extended position to move said second valve to its open position; and means to latch said actuating means at its retracted position, said latch means being releasable in response to operation of said locking means.

References Cited in the file of this patent

UNITED STATES PATENTS

| | | |
|---|---|---|
| 2,461,818 | Hague | Feb. 15, 1949 |
| 2,637,572 | Bruce | May 5, 1953 |
| 2,678,834 | Courtot | May 18, 1954 |
| 2,962,303 | Ramberg | Nov. 29, 1960 |